Nov. 1, 1955  W. H. HAUPT  2,722,611
X-RAY APPARATUS

Filed April 30, 1953  2 Sheets—Sheet 1

INVENTOR.
WALTER H. HAUPT
BY
Marechal Biebel French & Bugg
ATTORNEYS

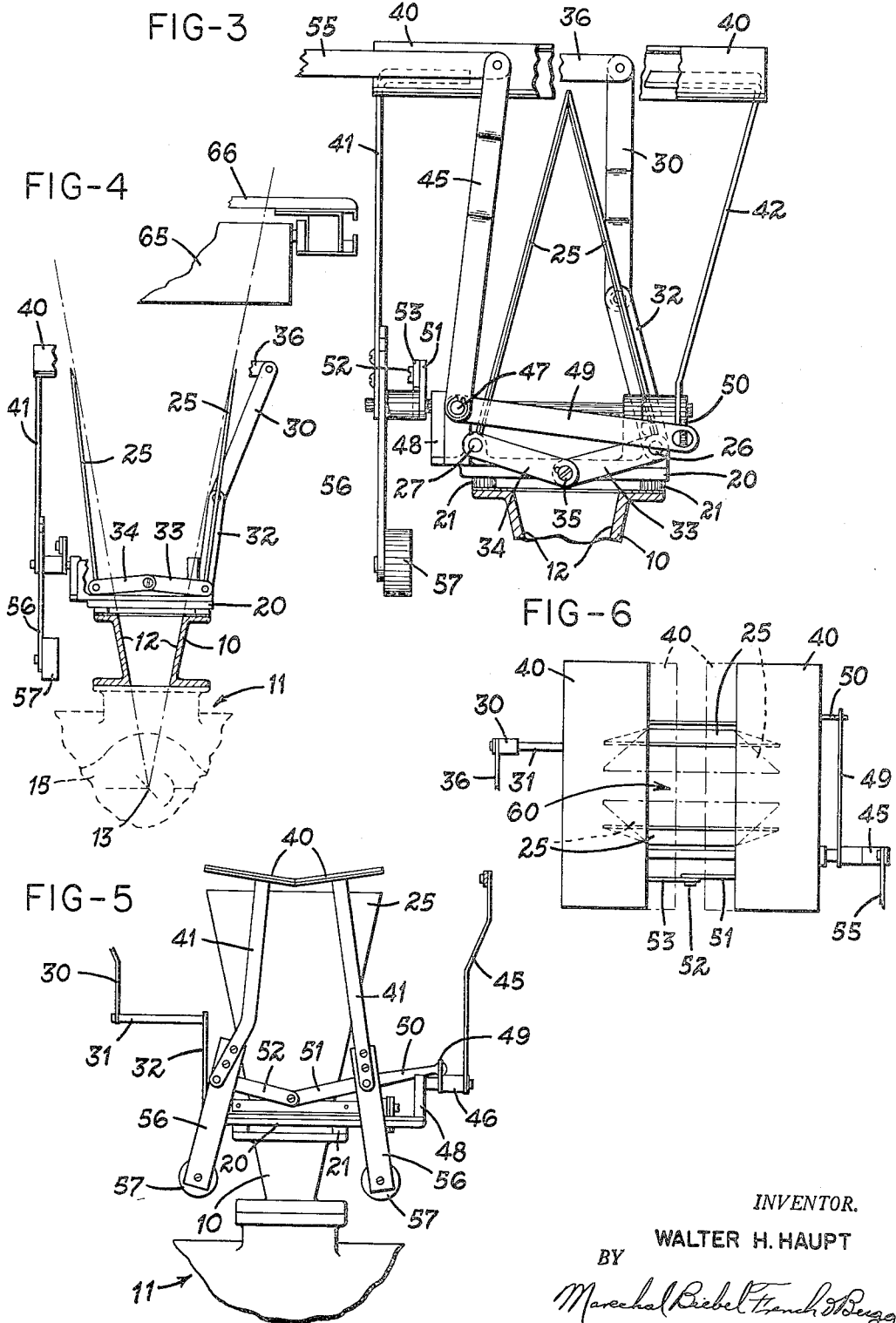

United States Patent Office 2,722,611
Patented Nov. 1, 1955

2,722,611

X-RAY APPARATUS

Walter H. Haupt, Kenton Hills, Ky., assignor to Keleket X-Ray Corporation, Covington, Ky., a corporation of Ohio Application April 30, 1953, Serial No. 352,157

4 Claims. (Cl. 250—105)

This invention relates to apparatus for controlling the shape and size of a beam of radiation such as an X-ray beam.

In X-ray work, particularly for purposes of medical treatment or examination, unless the X-ray beam is confined to the desired size and pattern at all times, injury to both the patient and the operator may result. Shuttering of the X-ray beam is especially important in radiographic and fluoroscopic work utilizing an X-ray table and a film tunnel or fluorescent screen, and for such purposes, shuttering is desirable at a location as close as possible to the patient in order to obtain maximum clarity of the image. It is also desirable in such work to be able to adjust the shutters with the tube head throughout the maximum range both laterally and longitudinally of the table.

Satisfactory results from the standpoint of effective shuttering have been obtained by a shutter unit provided with two pairs of overlapping blades arranged for sliding movement towards and away from each across the path of the beam to define a rectangular shutter opening, and the dimensions of such opening are varied separately by adjustment of one or the other pair of blades. With such construction, however, it will be apparent that each pair of blades requires a total space equal to twice the corresponding maximum dimension of the beam at the shutter position, which establishes a definite limit beyond which the shutter unit cannot be adjusted closer to the edge of the table top. This limit is theoretically at a distance from the table edge equal to one-half the corresponding maximum dimension of the beam, and in practice it is somewhat greater owing to the space necessarily required for the guiding and operating parts for the shutter blades.

Another complicating factor with shutters of this type is the difficulty of properly guiding the sliding blades. For optimum definition, the opposite edges of the blades should be maintained accurately parallel, and this relationship is difficult to maintain without relatively complicated guiding mechanisms, including proper bearings or the like. Since, however, the space and weight limitations practically preclude such installations, it is commonly found necessary to use simple slideways for the shutter blades and to provide enough clearance to prevent both jamming and uncocking of the blades as they slide therein.

One of the primary objects of the present invention is to provide a shutter device for an X-ray beam in which adjustment of the shutter members along one dimension of the beam section does not require more space than the maximum desired such dimension of the beam at the shutter position, and which therefore can be shifted across substantially the entire range of the table top.

It is also a primary object of the invention to provide an adjustable shutter device in which all the moving parts are pivotally mounted to minimize the requirements of guiding of the beam-limiting members while maintaining smooth and effective straight-line movement of these members.

Additional objects and advantages of the invention will be apparent from the following description, the accompanying drawings and the appended claims.

In the drawings—

Fig. 3 is an elevational view looking from right to left in Fig. 2 with parts broken away for clarity of illustration and showing the shutter plates in closed position;

Fig. 4 is a somewhat diagrammatic view similar to Fig. 3 on a smaller scale showing the shutter plates in open position;

Fig. 5 is a view similar to Fig. 2 but on a smaller scale and showing the shutter blades in closed position; and Fig. 6 is a somewhat diagrammatic top view showing the operating relationship of the shutter plates and blades of this shutter device.

Figure 2:
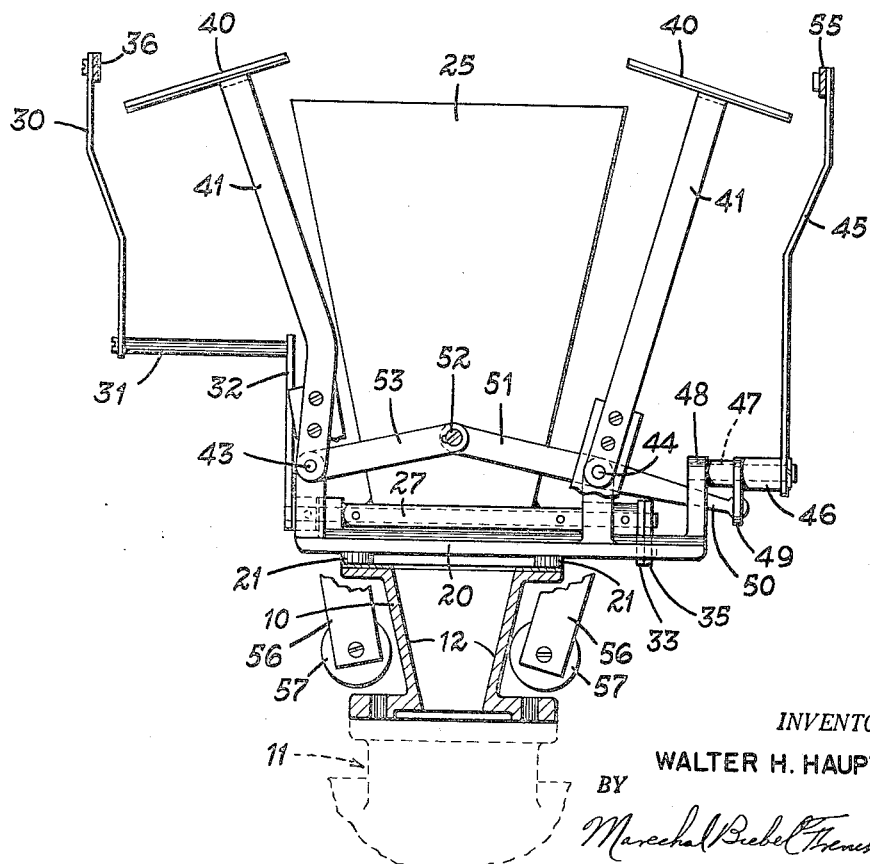
Fig. 2 is a side elevation of the shutter device showing the shutter plates in fully open position.

Referring to the drawings, which illustrate a preferred embodiment of the invention, Fig. 2 shows the flanged cone 10 which is directly mounted on the X-ray tube head shown fragmentarily at 11. The cone 10 is provided with a tapered passage 12 therethrough which is preferably centered on the focal spot 13 of tube 15 as indicated diagrammatically in Fig. 5, and the cone 10 therefore serves initially to define the shape and maximum angular dimensions of the X-ray beam projecting from the tube head.

The shutter unit of the invention is mounted on the cone 10 and includes a supporting frame 20 provided with bosses 21 facilitating bolting to cone 10 and having a rectangular opening 22 therethrough which is aligned with the passage 12 through cone 10. A pair of opposed shutter plates 25 regulates one cross-sectional dimension of the beam, and these plates 25 are pivotally mounted by shafts 26 and 27 at opposite sides of frame 20. As shown in Fig. 2, the plates 25 are trapezoidal in shape and are arranged with their smaller ends pivoted to the frame and with their inclined sides substantially in line with the corresponding tapered sides of the passage 12 through the cone 10 and thus substantially equal to the corresponding maximum angular dimension of the beam.

Figure 1:
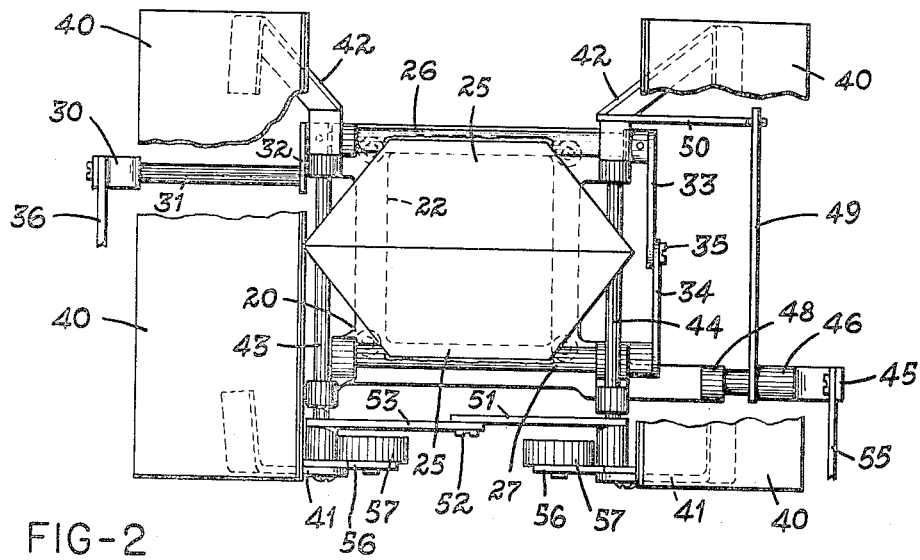
Fig. 1 is a top view showing a shutter device constructed in accordance with the invention and with certain parts broken away for clarity of illustration.

The plates 25 may be swung between the wide open position shown in Fig. 4 wherein their surfaces are approximately in line with the corresponding sides of passage 12 and the closed position shown in Figs. 1 and 3 wherein their wider ends are in effective contact to cut off the beam. Movement of plates 25 between these two positions is effected by a lever 30 connected by an extension 31 to a crank 32 secured to one end of the blade supporting shaft 26. The shaft 26 is in turn connected with the shaft 27 by a pair of cranks 33 and 34 pivoted together loosely at 35. The rod 36 represents a suitable connection from the arm 30 to exterior operating means for the shutters such as are usually mounted on a fluorescent screen or film tunnel (not shown).

Control of the shape and size of the X-ray beam in the direction at right angles to the dimension controlled by the shutter plates 25 is effected by a pair of shutter blades 40 supported for movement generally transversely of the beam adjacent the outer ends of shutter plates 25. As best shown in Fig. 1, each blade 40 is carried by a pair of arms 41 and 42 mounted on shafts 43 and 44 journaled on the frame 20 at the opposite sides of the opening 22 from shafts 26 and 27. These blades and arms are so located that the blades 40 may be swung between an open position (Fig. 2), wherein their inner edges are effectively in line with the wide edges of plates 25, and a closed position (Fig. 5) wherein their inner edges are in engagement to cut off transmission of the beam.

The blades 40 are controlled by one arm 45 of a bellcrank 46 pivoted on a shaft 47 carried by a projection 48 on frame 20. The other arm 49 of bellcrank 46 is loosely pivoted to a crank arm 50 secured to or integral with the blade supporting arm 42 on the shaft 44. The other end of this shaft carries a crank arm 51 loosely pivoted at 52 to a similar crank arm 53 on the shaft 43, the crank arms 51 and 53 being either secured to shafts 43 and 44 or to the adjacent hub portions of the arms 41. Thus movement of the crank arm 45 will raise or lower arm 50 to cause the arms 41 and 42 to swing towards or away from each and thus to move the blades 40 across the path of the beam. The part 55 represents a rod or other suitable connection similar to the part 36 and leading to the other operating mechanism, and one arm 41 for each blade 40 is also provided with an extension 56 carrying a counterweight 57 to facilitate the adjusting movement.

The plates 25 and blades 40 coact as shown diagrammatically in Fig. 6 to control the opposite dimensions of the shutter openings for the X-ray beam, and either of these pairs of shutter members may be adjusted as desired to vary the cross-section of the beam portion transmitted by the device, as indicated generally at 60 in Fig. 6. The pivotal mountings for the plates and blades provide for easy and relatively frictionless adjusting movement without requiring additional bearings or other guide means, thus correspondingly reducing both the weight and the overall size of the device and also facilitating accuracy of adjustment. At the same time, movement of each pair of plates or blades towards and away from each other is always in an effectively straight line, while elimination of the necessity of guiding means at the shuttering position makes it possible to locate the shutters at the maximum distance from the tube head permissible by the overall dimensions of the X-ray table and correspondingly contributes more sharply defined shuttering.

Another important practical advantage of this shuttering construction is illustrated diagrammatically in Fig. 4, which indicates at 65 a fragment of the bucky and at 66 a fragment of the top of an X-ray table. If the shutter unit of the invention is so mounted within the table that the plates 25 control the beam dimensions laterally of the table, the shutter can be shifted with the tube head laterally of the table to positions so close to the sides of the table that the effective beam can be directed through any part of the table top substantially up to its edge. This advantageous result derives primarily from the provision of the shutter plates and the fact that in their fully open position, they do not require appreciably more space than the corresponding dimension of the beam, as contrasted with shutters employing sliding plates which require substantially greater space as discussed above. The shutter construction of the invention therefore provides an increased range of shutter movement in addition to its other noted advantages.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An adjustable shutter device of the character described for use in conjunction with an X-ray tube to regulate the shape and size of the effective X-ray beam, comprising a supporting frame having an opening therethrough for transmission of said beam, a pair of shutter blades, a pair of arms associated with each said blade and pivoted on said frame on opposite sides of said opening to support said blades for swinging movement towards and away from each other across the path of said beam to define one pair of opposite sides of the portion of said beam projecting therebeyond, means including a crank directly connected with one of said arms to cause said swinging movement thereof, a pair of loosely pivoted links connecting said one arm with one of the arms in the other said pair thereof to cause conjoint movement of said arms and said blades to vary the dimension of said beam portion between said blades, means carried by said arms for counterweighting said arms and said blades to facilitate said movement thereof, a pair of shutter plates located between said frame and said blades and lying within the space defined by said swinging arms, pivot means on said frame mounting the inner ends of said plates for pivotal movement on the other pair of opposite sides of said opening from said blades, said plates being proportioned to extend generally in the direction of said beam from said frame to positions closely adjacent said blades to confine the other pair of opposite sides of said beam, and means for shifting said plates on said pivot means to vary the effective cross-section of the portion of said beam projecting therebeyond towards said blades.

2. An adjustable shutter device of the character described for use in conjunction with an X-ray tube to regulate the shape and size of the effective X-ray beam, comprising a supporting frame having an opening therethrough for transmission of said beam, a pair of shutter plates, pivot means on said frame mounting the inner ends of said plates for pivotal movement on one pair of opposite sides of said opening with said plates extending generally in the direction of said beam to confine the sides of said beam, means for shifting said plates on said pivot means between a closed position wherein the outer ends thereof are substantially in contact and an open position defining the corresponding pair of opposite sides of said beam, arms pivoted on said frame on axes located adjacent the other pair of opposite sides of said opening and substantially perpendicular to said pivot means for said plates, said arms being located laterally outwardly of said plates and extending generally in the direction of said beam, a pair of shutter blades mounted on said arms outwardly of said plates for movement with said arms across the path of said beam to define the other pair of opposite sides of portions of said beam projecting therebeyond, control means for moving said arms, and means counterweighting said arms and blades to facilitate said movement thereof.

3. An adjustable shutter device of the character described for use in conjunction with an X-ray tube to regulate the shape and size of the effective X-ray beam, comprising a supporting frame having a generally rectangular opening therethrough for transmission of said beam, a pair of shutter plates, each of said plates being generally trapezoidal in outline with the side edges thereof inclined at an angle substantially equal to the maximum corresponding angular dimension of said beam transmitted through said opening, pivot means on said frame mounting the smaller ends of said plates for pivotal movement on one pair of opposite sides of said opening with said plates extending generally in the direction of said beam to confine the corresponding pair of opposite sides of said beam, means for shifting said plates on said pivot means between a closed position wherein the outer ends thereof are substantially in contact and an open position defining said pair of opposite sides of said beam, a pair of shutter blades arranged generally transversely of said beam, and means mounting said blades on said frame outwardly of said plates for movement transversely of said beam and generally parallel with said pivot means to define the other pair of opposite sides of the portion of said beam projecting therebeyond.

4. An adjustable shutter device of the character described for use in conjunction with an X-ray tube to regulate the shape and size of the effective X-ray beam, comprising a supporting frame having a generally rectangular opening therethrough for transmission of said beam, a pair of shutter plates, each of said plates being generally trapezoidal in outline with the side edges thereof inclined at an angle substantially equal to the maximum corresponding angular dimension of said beam transmitted through said opening, pivot means on said frame mounting the smaller ends of said plates for pivotal movement on one pair of opposite sides of said opening with said plates extending generally in the direction of said beam to confine the corresponding pair of opposite sides of said beam, means for shifting said plates on said pivot means between a closed position wherein the outer ends thereof are substantially in contact and an open position defining said pair of opposite sides of said beam, arms pivoted on said frame on axes located adjacent the other pair of opposite sides of said opening from said pivotal means and extending generally in the direction of said beam, a pair of shutter blades mounted on said arms outwardly of said plates for movement with said arms across the path of said beam to define the other pair of opposite sides of portions of said beam projecting therebeyond, and means for controlling said movement of said arms.

References Cited in the file of this patent

UNITED STATES PATENTS

| | | |
|---|---|---|
| 2,542,196 | Haupt | Feb. 20, 1951 |
| 2,570,820 | Knab | Oct. 9, 1951 |